United States Patent [19]

Keyser

[11] 4,283,068
[45] Aug. 11, 1981

[54] SLED STRUCTURE

[76] Inventor: Shirley A. Keyser, P.O. Box 52, Butte, Mont. 59701

[21] Appl. No.: 110,550

[22] Filed: Jan. 8, 1980

Related U.S. Application Data

[63] Continuation-in-part of Ser. No. 17,490, Apr. 23, 1979, abandoned.

[51] Int. Cl.³ .................. B62B 13/16; A61G 1/00
[52] U.S. Cl. .................................. 280/19; 5/82 B; 224/158; 224/921; 280/24
[58] Field of Search .............. 280/18, 19, 20, 24, 280/12 A, 12 R; 5/82 R, 82 B; 224/153, 156, 158, 921; D12/6, 128

[56] References Cited

U.S. PATENT DOCUMENTS

| 1,438,921 | 12/1922 | King | 224/158 |
| 3,140,878 | 7/1964 | Davis | 280/18 |
| 3,484,801 | 12/1969 | Carlin | 280/18 |
| 3,547,456 | 12/1970 | Sapp | 280/19 |
| 3,601,824 | 8/1971 | Bradford | 5/82 |
| 3,771,808 | 11/1973 | Duerst | 280/19 |
| 4,046,393 | 9/1977 | Vadnais | 280/19 |
| 4,132,427 | 1/1979 | McGee | 280/19 |
| 4,173,351 | 11/1979 | Hetland | 280/19 |

FOREIGN PATENT DOCUMENTS

| 487858 | 5/1918 | France | 5/82 |
| 118596 | 4/1947 | Sweden | 280/19 |

Primary Examiner—Robert J. Spar
Assistant Examiner—Edward M. Wacyra
Attorney, Agent, or Firm—Arthur L. Urban

[57] ABSTRACT

A sled structure including a body supporting portion, a head supporting portion and a towing portion; the body supporting portion and the head supporting portion together forming a substantially flat flexible sheet-like structure, the body supporting portion being of a generally elongated configuration, the body supporting portion including a main section with peripheral side sections and an end section, the side and end sections being foldable with respect to the main section, a plurality of fasteners disposed in the side and end sections, the head supporting portion extending from one end of the body supporting portion, spaced first and second tubular passages extending from one edge of the sled structure to the other, continuous cord extending from a fastener adjacent one corner of the end section to a fastener located in the side section remote from the corner and thereafter to a fastener disposed in the other side section and back and forth between fasteners in the side sections in a zigzag pattern to the first tubular passage and therethrough to the opposite edge of the sled structure and then through the second tubular passage, the cord forming a loop portion and returning through the second tubular passage and the first tubular passage in directions opposite to its initial path therethrough and thereafter between the fasteners in the side sections in a zigzag pattern disposed from the initial zigzag pattern to a fastener located in the end section adjacent to another corner thereof.

11 Claims, 4 Drawing Figures

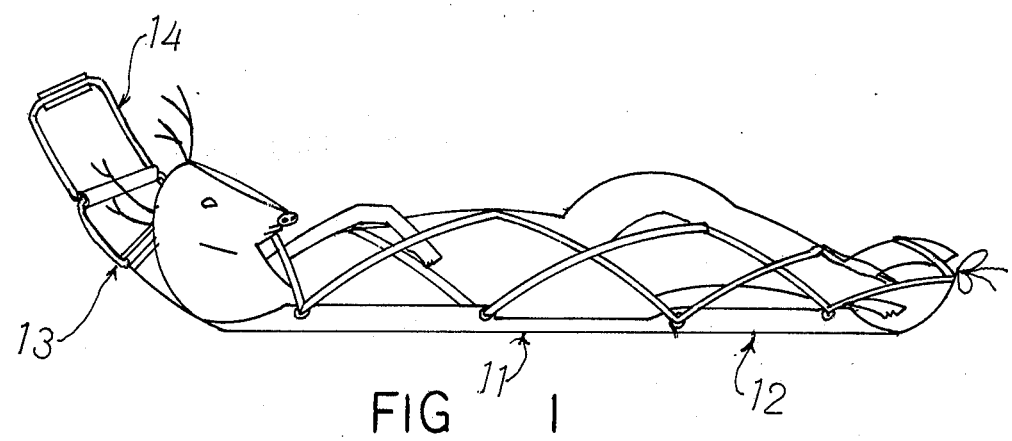
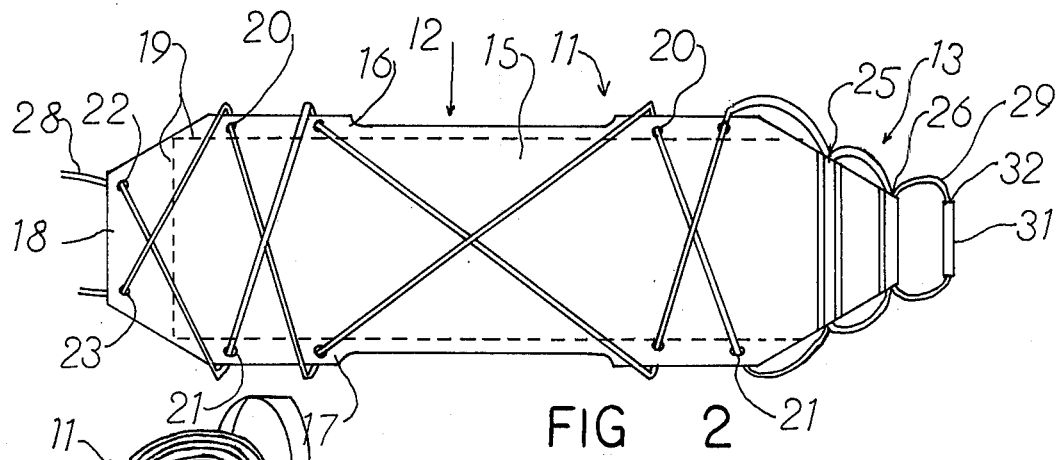
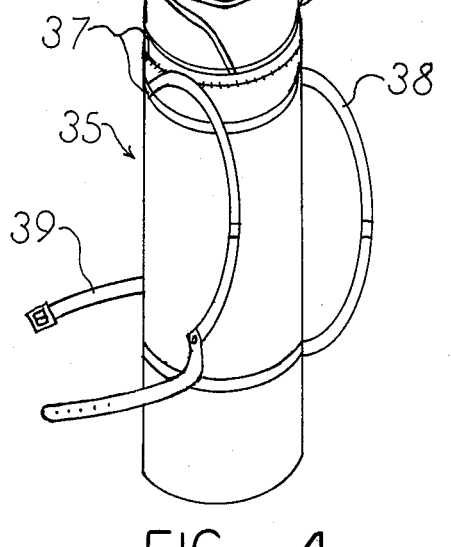
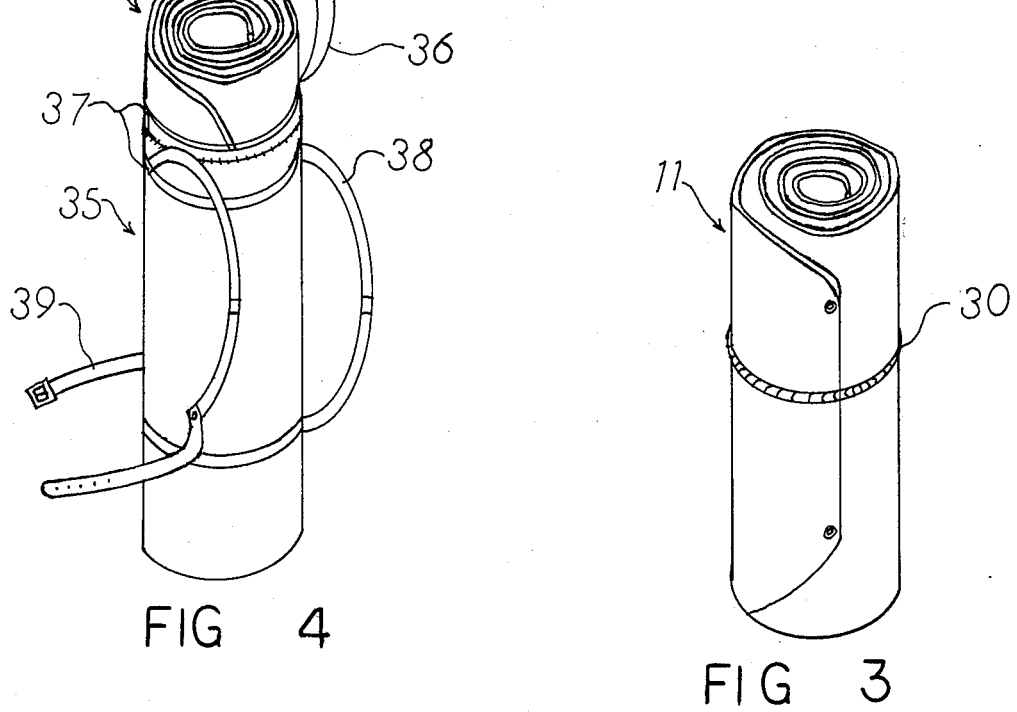

SLED STRUCTURE

This application is a continuation-in-part of application Ser. No. 17,490, filed Apr. 23, 1979, now abandoned.

This invention relates to a novel sled structure and more particularly relates to a new evacuation sled.

Outdoorsmen who frequent wilderness areas sometimes need to remove large objects from inaccessible locations. Such a situation often arises with hunters after they have killed big game such as deer, elk, moose, antelope, sheep, goats, etc. Since hunters frequently travel long distances as they stalk their quarry, transporting the carcass out to a road after the game is killed may be a major undertaking. Similar problems may arise if a member of a hunting party or exploring group is injured or becomes ill.

Because of the size and weight of the person, animal or other object which needs to be transported, and the rugged terrain over which it is necessary to travel, one person may find it extremely difficult if not impossible to accomplish the task.

Generally the methods and equipment employed in such situations are often very crude and of the makeshift variety. With game, hunters may simply drag the animal back to a road. While it may be possible to pull the carcass over the ground if it is covered with a thick layer of snow, there still may be rocks exposed which can damage the skin of the animal. However, if the ground is not covered with snow or if a sick or injured person is to be transported, it is not possible to drag the body over the ground. In these cases, it is necessary to employ some type of sled. Such a sled may be a structure which has been included with the supplies or may be simply a ground cover or tarpaulin.

One of the considerations in selecting a sled to be included with the supplies which are packed into the wilderness is the weight and space that will be taken by the sled structure. Excess weight and/or volume of the load which must be packed will cause the packers to become more tired. As a result, backpackers always try to reduce the size and weight of their load as much as possible. Since the sled may not be used on a particular trip, there is a tendency for backpackers to eliminate this item from their supplies and instead only carry essential items.

It is only after an outdoorsman has encountered a situation in which he needed a sled and did not have one that the importance of a sled is fully realized. Since there are many such sportsmen, there is a continuing effort to find a lightweight, collapsible sled structure that can be carried with a minimum of inconvenience, which still provides a convenient means for removing a person or animal from a remote area without damage.

Some of these structures are simple skids that can be rolled into a small space. For example, see U.S. Pat. Nos. 4,046,393; 3,547,456; and 3,771,808. Although such sleds do provide some improvement over tarps or nothing at all, they still leave much to be desired. Generally, they do not protect the head of the person or animal sufficiently. Thus, the head may be injured as the body is drawn over the ground. This can be an important factor if a person is being carried and also if the big game animal has a trophy head that the hunter wishes to mount. In such cases, it is essential that the head be protected. With some structures, the head may be completely enclosed which is acceptable for a trophy head but may not be acceptable for transporting a human being. Another factor with devices that provide protection for the head is that most such structures are elaborate and costly and utilize considerable weight and space.

The present invention provides a novel sled structure which includes features not present on sleds heretofore proposed. The sled structure of the invention protects the head as well as the body being carried. The protection of the head afforded by the sled of the invention prevents injury thereto during the transporting process.

The sled structure of the invention can be included with other supplies without adding significantly to the weight or volume thereof. In addition, the sled structure can be rolled into a very small space. Furthermore, the sled structure is light in weight. The carrying case of the sled of the invention also can be utilized for the storage of other items.

The sled structure can be used conveniently by the ordinary sportsman with a minimum of instruction. The sled simplifies strapping of a body to the sled and proper orientation of the body on the sled. The configuration of the sled enables one person to transport a body easily even over rugged terrain.

The sled structure of the invention is simple in design. The sled structure can be manufactured from commercially available materials utilizing conventional fabricating techniques. The sled can be fabricated relatively inexpensively.

Other benefits and advantages of the novel sled structure of the present invention will be apparent from the following description and the accompanying drawings in which:

FIG. 1 is a view in perspective of one form of the sled structure of the invention with a slain big game animal secured thereto;

FIG. 2 is a top view of the sled structure shown in FIG. 1;

FIG. 3 is a view in perspective of the sled structure shown in FIG. 2 rolled into a cylindrical configuration; and FIG. 4 is a view in perspective of the rolled sled shown in FIG. 3 being inserted into a cover member.

As shown in the drawings, one form of the novel sled structure 11 of the present invention includes a body supporting portion 12, a head supporting portion 13 and a towing portion 14. The body supporting portion 12 and the head supporting portion 13 are joined to form a substantially flat flexible sheet-like structure, which preferably is formed of a plastic material.

The body supporting portion 12 is of a generally elongated configuration and includes a main section 15 with peripheral side sections 16 and 17. The body supporting portion 12 also includes an end section 18. The side and end sections 16, 17 and 18 are foldable with respect to the main section 15. Advantageously, the side sections 16 and 17 and the end section 18 are foldable with respect to the main section 15 along scored lines 19, that is, lines of reduced thickness. The end section 18 preferably is wider than the side sections 16 and 17. The side sections 16 and 17 advantageously may include portions of reduced width along their lengths.

A plurality of fastening means are disposed along the side sections 16 and 17 and end section 18. The fastening means may take a variety of forms including hooks and preferably as shown, grommets 20, 21, 22 and 23. The fastening means preferably are spaced along the lengths of the side and end sections.

Head supporting portion 13 extends from one end of body supporting portion 12. A tubular passage 25 extends from one edge of sled structure 11 to the other adjacent the juncture of the body supporting portion 12 and the head supporting portion 13. A second tubular passage 26 is located adjacent the free end of the head supporting portion 13. The second tubular passage 26 is spaced from the first tubular passage 25 and disposed substantially parallel thereto. Advantageously, as shown in FIG. 2, the head supporting portion 13 and the adjacent part of the body supporting portion 12 taper to a reduced width at the forward end of the sled.

Continuous cord means connect the fastening means, that is, grommets 20, 21, 22 and 23 and tubular passages 25 and 26 in a particular pattern. Cord 28 extends from grommet 22 which is adjacent one corner of the end section 18 through a grommet 21 located in the side section 17 remote therefrom and then through a grommet 20 in the opposite side section 16. The cord 28 next is threaded through succeeding grommets 20 and 21 located in side sections 16 and 17 in a zigzag pattern to the first tubular passage 25.

The cord 28 is threaded through the first tubular passage 25 to the opposite side of the sled structure and along the edge thereof to the second tubular passage 26. The cord is threaded through the second passage 26 and out the opposite end.

The cord 28 is formed into a loop 29 at the front of the sled. Advantageously, loop portion 29 includes a handle section 31 which preferably includes a tubular opening 32 through which cord 28 is threaded. Thereafter, the cord is returned through the second tubular passage 26 in a direction opposite to its initial path through the passage. The cord next passes along the edge of the head supporting portion 13 to the first tubular passage 25 and therethrough in a direction opposite to its initial path. Thereafter, the cord 28 is threaded through the grommets 20 and 21 in a zigzag pattern similar to the initial zigzag pattern but spaced therefrom to provide a generally symmetrical lacing pattern. Finally, the cord is threaded through grommet 23 located in the end section 18 adjacent an opposite corner from that in which grommet 22 is located.

FIG. 3 illustrates the sled structure 11 of the invention rolled into a cylindrical configuration for storage or transporting. The sled may be maintained in this cylindrical configuration with an elastic band 30 if desired. To facilitate transporting of the sled, a cover member advantageously is provided as shown in FIG. 4. Preferably, the cover is a tubular cover member 35 of a size substantially the same as the coiled configuration of the sled structure. The cover member 35 may have a closable opening at one end, shown in the drawings as a circular flap portion 36 which may be maintained in a closed position with a suitable fastener such as a zipper. To facilitate carrying of the sled in cover member 35, a harness member 37 may be utilized. The harness member 37 may included shoulder strap means 38 and a waist encircling section 39.

In the use of the sled structure of the invention as shown in the drawings, the sled rolled in a cylindrical configuration and contained in cover member 35 is carried as a backpack utilizing harness 37. The arms of a person are slipped through the shoulder straps 38 and waist encircling section 39 is wrapped around the waist of the carrier and fastened. Since the rolled sled has a space along its axis, this empty space inside the cover 35 can be filled with various items which the carrier may desire to take with him. For example, maps, sandwiches, gloves, bullets, flares, a lightweight jacket or the like may be carried.

When it is necessary to use the sled for the evacuation of slain game or an injured or ill person, the coiled sled is removed from the cover member 35 and unrolled into its substantially flat form. The body is positioned on the body supporting portion 12 with the head on the head supporting portion 13.

One end of cord or rope 28 is threaded through grommet 22 in one corner of end section 18. The cord 28 then is passed over the body and threaded back and forth between grommets 20 and 21 in respective side sections 16 and 17 in a zigzag pattern. When the cord has been laced up the side sections to the first tubular passage 25, the cord is threaded therethrough and then through the second tubular passage 26.

Next, the cord is threaded through tubular handle 31 and back through the two tubular passages 25 and 26 in a direction opposite to its initial path therethrough. The cord 28 then is laced over the body through the grommets 20 and 21 in a zigzag pattern similar to the initial zigzag pattern but displaced therefrom. The two zigzag patterns provide a generally symmetrical lacing pattern as shown in FIG. 2. As the cord 28 is laced through grommets 20 and 21, the side sections 16 and 17 are drawn upwardly and fold along scored lines 19. Finally, the cord 28 is threaded through grommet 23 located in the opposite corner of end section 18 opposite to grommet 22 and pulled tight which draws the end section upwardly. The ends of the cord 28 then can be tied together to secure the body to the sled.

The sled with the animal or person strapped thereto is then ready to be drawn back to an evacuation vehicle. Handle section 31 is grasped to tow the sled. Exerting a force on handle section 31 that has cord 28 passing therethrough causes the cord which is threaded through grommets 20-23 to tighten around the body on the sled. This tightening of the cord draws the body more tightly against the sled to prevent shifting thereof as the sled is towed over the rough terrain.

As the handle section 31 is pulled, the head supporting portion 13 is raised off the ground which places the head of the person or animal in a protected position. The sled then can be drawn easily over a variety of ground conditions such as pine needles, grass, dirt, sand, rocks, sticks, dead fall, swampy ground, snow or other ground conditions over which hunters or outdoorsmen travel. The towing can be done conveniently without fear of tearing, bruising or otherwise damaging the meat of the animal or the body of the person being carried from the wilderness. When the evacuation vehicle is reached, the sled with the body thereon can be loaded directly into the vehicle without removing the body from the sled. The sled then can be tied in place within the vehicle. If desired, the sled with the body thereon can be placed on a board or stretcher before loading it into the vehicle.

The above description and the accompanying drawings show that the present invention provides a novel sled structure which does not occupy appreciable space or add significantly to the weight of the supplies being carried. The sled of the invention is light in weight and is convenient to carry. The sled enables one person to transport a body over rough terrain easily.

The sled structure of the present invention is simple to use by ordinary sportsmen with a minimum of instruction. The design of the sled provides proper orientation of the body on the sled and simplifies strapping of the body thereon. The sled structure provides protection for the body of the person or animal being carried particularly the head thereof. This is especially important when carrying a person or an animal with a trophy head.

The sled of the invention can be fabricated from commercially available materials relatively inexpensively by semiskilled labor. Furthermore, the carrying case for the sled also can be used to carry small items.

It will be apparent that various modifications can be made in the particular sled structure described in detail and shown in the drawings within the scope of the invention. For example, the size and configuration of the components can be changed to meet specific requirements. The material of which the sled is fabricated advantageously is a heavy plastic film although other sheet materials may be employed. The color preferably is a brilliant hue so that it is easily identifiable by other hunters. The cord or rope preferably is a nylon, polyester or polyethylene material. Also, the sled structure of the invention can be used for a number of different purposes. The sled can be used as a tarpaulin for a shelter or ground cloth. In addition, the sled, especially if it is a brilliant color can be used as a signal. Therefore, the scope of the invention is to be limited only by the following claims.

What is claimed is:

1. A sled structure including a body supporting portion, a head supporting portion and a towing portion; said body supporting portion and said head supporting portion together forming a substantially flat flexible sheet-like structure, said body supporting portion being of a generally elongated configuration, said body supporting portion including a main section with peripheral side sections and an end section, said side and end sections being foldable with respect to said main section, a plurality of fastening means disposed in said side and end sections, said head supporting portion extending from one end of said body supporting portion, a tubular passage extending from one edge of said sled structure to the other adjacent the juncture of said body supporting portion and said head supporting portion, a second tubular passage adjacent the free end of said head supporting portion, said second tubular passage being spaced from and substantially parallel to said first tubular passage, continuous cord means extending from fastening means adjacent one corner of said end section to fastening means located in the side section remote from said corner and thereafter to fastening means disposed in the other side section and back and forth between fastening means in said sections in a zigzag pattern to said first tubular passage and therethrough to the opposite edge of said sled structure and then through said second tubular passage, said cord means forming a loop portion and returning through said second tubular passage and said first tubular passage in directions opposite to its initial path therethrough and thereafter between said fastening means in said side sections in a zigzag pattern disposed from said initial zigzag pattern to fastening means located in said end section adjacent to another corner thereof.

2. A sled structure according to claim 1 wherein said loop portion of said cord means extending beyond said head supporting portion includes a handle section.

3. A sled structure according to claim 2 wherein said handle section includes a tubular opening through which said cord means passes.

4. A sled structure according to claim 1 wherein said end section of said body supporting portion is wider than said side sections thereof.

5. A sled structure according to claim 1 wherein said side sections include portions of reduced width along their lengths.

6. A sled structure according to claim 1 wherein said head supporting portion tapers to a reduced width.

7. A sled structure according to claim 1 wherein said side sections and said end section are foldable with respect to said main section along scored lines.

8. A sled structure according to claim 1 including a tubular cover member for said sled structure when it is rolled into a cylindrical configuration.

9. A sled structure according to claim 8 wherein said cover member includes a harness member having shoulder strap means for carrying said rolled sled structure within said cover member in a generally vertical orientation.

10. A sled structure according to claim 9 wherein said harness member includes a waist encircling section.

11. A sled structure according to claim 8 wherein said cover member includes a circular flap portion at one end thereof.

* * * * *